(12) United States Patent
Gaertner, II et al.

(10) Patent No.: US 7,922,121 B2
(45) Date of Patent: Apr. 12, 2011

(54) POWER DISTRIBUTION ARCHITECTURE FOR AN ICE PROTECTION SYSTEM

(75) Inventors: James Robert Gaertner, II, Hastings, MN (US); Mark Douglas Glewwe, Prior Lake, MN (US); Eric D. Anderson, Hudson, WI (US)

(73) Assignee: Rosemount Aerospace Inc., Burnsville, MN (US)

( * ) Notice: Subject to any disclaimer, the term of this patent is extended or adjusted under 35 U.S.C. 154(b) by 823 days.

(21) Appl. No.: 11/974,697

(22) Filed: Oct. 15, 2007

(65) Prior Publication Data

US 2009/0095842 A1    Apr. 16, 2009

(51) Int. Cl.
*B64D 15/00*    (2006.01)
*B64D 15/12*    (2006.01)
(52) U.S. Cl. .................................. 244/134 D; 244/134 R
(58) Field of Classification Search .............. 244/134 D, 244/134 R; 60/39.093
See application file for complete search history.

(56) References Cited

U.S. PATENT DOCUMENTS

| 6,227,492 | B1 * | 5/2001 | Schellhase et al. ....... 244/134 D |
| 2006/0226292 | A1 * | 10/2006 | Houlihan et al. ......... 244/134 R |
| 2008/0152494 | A1 * | 6/2008 | Froman ........................ 416/95 |

FOREIGN PATENT DOCUMENTS

WO    WO 2005073084 A1 *    8/2005

* cited by examiner

*Primary Examiner* — Tien Dinh
*Assistant Examiner* — Richard R Green
(74) *Attorney, Agent, or Firm* — Scott D. Wofsy; Edwards Angell Palmer & Dodge LLP

(57) ABSTRACT

An ice protection system for a vehicle is disclosed which includes a plurality of de-ice power distribution units positioned proximate to a leading edge surface of the vehicle that is susceptible to ice accretion, at least two anti-ice power distribution units located within the vehicle, spaced from the de-ice power distribution units, and a point of power regulation located within the vehicle, spaced from the power distribution units, from which power is fed to the power distribution units through independent feeder wire bundles so as to distribute line current across the system in a manner that optimizes wire weight.

15 Claims, 3 Drawing Sheets

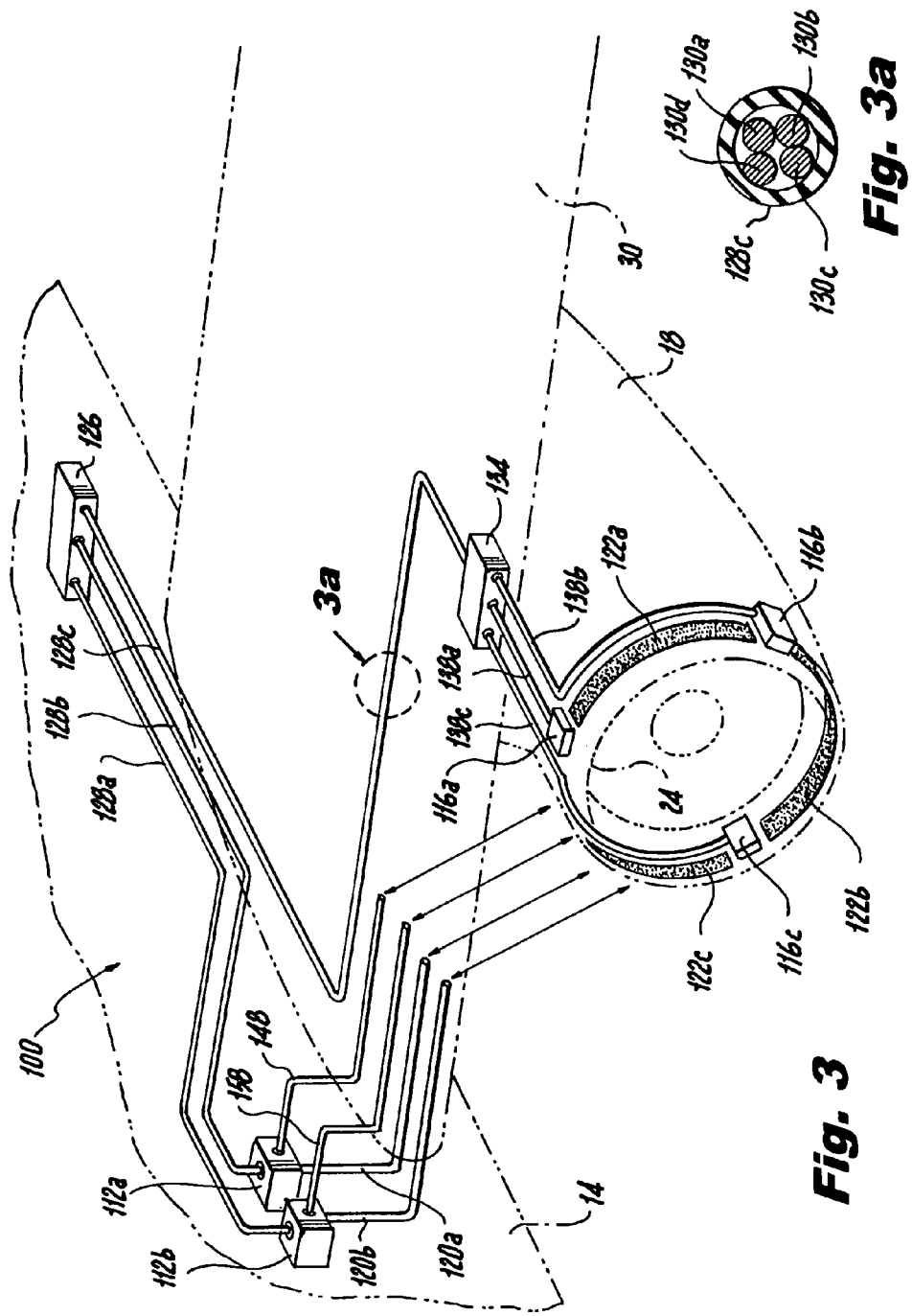

POWER DISTRIBUTION ARCHITECTURE FOR AN ICE PROTECTION SYSTEM

BACKGROUND OF THE INVENTION

1. Field of the Invention

The subject invention is directed to a power distribution architecture for an ice protection system in an aircraft, which minimizes wire weight while distributing by-product waste power to several line replaceable units.

2. Description of Related Art

Since the early days of powered aviation, aircraft have been troubled by the accumulation of ice on critical component surfaces such as wings and struts, under certain flight conditions. Unchecked, accumulations of ice can eventually so laden an aircraft with additional weight and so alter the aerofoil configuration of the wings as to precipitate an unacceptable flying condition. There are three generally accepted approaches that have been developed to combat the accumulation of ice on component surfaces of an aircraft under flying conditions. These approaches include thermal de-icing, chemical de-icing and mechanical de-icing.

In the case of thermal de-icing, leading edges (i.e., the edges of an aircraft component on which ice accretes and are impinged upon by the air flowing over the aircraft and having a point at which this airflow stagnates) are heated to loosen adhesive forces between accumulating ice and the component. Once loosened, the ice is blown from the component surface by the airstream passing over the aircraft.

In one thermal de-icing approach, a heating element is placed in the leading edge zone of the component or by incorporation into the skin structure of the component. This heating element is typically powered by electrical energy derived from a generating source driven by one or more of the aircraft engines. The electrical energy is intermittently or continuously supplied to provide heat sufficient to prevent the formation of ice or to loosen accumulating ice. An example of a heating element for a thermal de-icing system is described in U.S. Pat. No. 5,351,918 to Giamati et al., the disclosure of which is incorporated herein by reference in its entirety.

A baseline prior art thermal de-icing system for an engine inlet (or nacelle) of an aircraft is illustrated in FIG. 2 of the subject application and is designated generally by reference numeral 10. De-icing system 10 includes controller 12 located in the aircraft fuselage 14. Controller 12 has two communication channels (channel A, channel B) and each communicates with a plurality of power distribution units (PDUs) 16a-16c located within the engine nacelle 18 through respective communication lines 20a, 20b. More particularly, controller 12 is adapted and configured to control the supply of energy delivered from the PDUs 16a-16c to heating element segments 22a-22c embedded within the lip or leading edge 24 of the engine nacelle 18 for ice removal.

The power distribution units 16a-16c receive power from a point of regulation (POR) 26 located within the aircraft fuselage 14. More particularly, three-phase power is delivered from the POR 26 to the PDUs 16a-16c through a single primary power cable 28. In this example, power cable 28 extends approximately 80 feet from the POR 26, through the fuselage 14, aircraft wing 30 and pylon 32, to a junction box 34 located in or near engine nacelle 18. Secondary power cables 38a, 38b and 38c (each averaging about 7.67 feet in length, in this example) extend from junction box 34 to the PDUs 16a-16c.

Because the primary power cable 28 is carrying three-phase power, it includes four individual wires, including three power-carrying wires and one neutral wire. The weight of these wires is a dominant factor in the overall weight of the de-icing system 10, and is a significant factor to be taken into account in designing and optimizing such a system.

Wire weight is determined using MIL-W-5088L. More particularly, in the exemplary ice protection system of FIG. 2, the three-phase line current would be 67 A. Derating the wire in accordance with MIL-W-5088L for 25,000 ft. altitude operation at 25° C. and a four-conductor power feed system with 75% utilization (i.e., 3 of the 4 wires in cable 28 carry power) yields a requirement for AWG 8 wire. In the present example, power cable 28 includes about 80 feet of three phase AWG 8 wire, which weighs about 18.4 lbs. This constitutes 95% of the prior art system wiring weight and is significant.

An additional design consideration in a de-icing system such as that which is shown in FIG. 2, is the weight of the power distribution units, which are line replaceable units (LRU), and by-product power dissipation from the LRUs. Both excess weight and LRU power dissipation are undesirable characteristics of a typical thermal de-icing system. Power dissipation requires large heat sinks, which add to the weight of the LRU. Moreover, heat sinks are largely ineffective at higher altitudes. The LRUs in the exemplary prior art de-icing system of FIG. 2 (i.e., the dual channel controller 12a, 12b and power distribution units 16a-16c) collectively weigh about 79 lbs. The estimated by-product power dissipated for each nacelle-based PDU in this example is about 56W.

Given the design deficiencies associated with the prior art baseline de-icing system exemplified in FIG. 2, it would be beneficial to design a thermal de-icing system for an aircraft, which minimizes wire weight of the power cables feeding the LRUs and effectively distributes by-product waste power to multiple LRUs in a manner that minimizes LRU heat rise.

In overcoming the deficiencies of the prior art baseline de-icing system, the subject invention provides the power distribution architecture of an ice protection system that optimizes system weight (i.e., wire weight and LRU weight) while efficiently distributing by-product waste power amongst several LRUs. Moreover, by employing the novel power distribution architecture of the subject invention, which locates the anti-ice power distribution function within the aircraft fuselage, the power dissipation per nacelle-based PDU is decreased and the bulk of the by-product waste power dissipation for the system is moved from the nacelle, where space is limited and air may be thinner, to the aircraft fuselage where the environment is more conducive to by-product power dissipation.

SUMMARY OF THE INVENTION

The subject invention is directed to a new and useful power distribution architecture for use with an ice protection system, and more particularly, to an ice protection system for a vehicle, such as an aircraft, that optimizes system weight (i.e., wire and electronics weight) while efficiently distributing by-product waste power across the system electronics.

In one embodiment of the subject invention, the ice protection system includes a plurality of de-ice power distribution units positioned proximate to a leading edge surface that is susceptible to ice accretion. Such surfaces can include, for example, engine inlets, wings, struts, stabilizers, rotors and propellers. The system further includes at least two anti-ice power distribution units that are located within the vehicle, spaced from the de-ice power distribution units. These LRUs have integrated controllers and provide system redundancy in the event of unit failure.

By placing the anti-ice power distribution function within the vehicle, rather than proximate to the leading edge surface that is susceptible to ice accretion, by-product power dissipation is optimized. Moreover, by moving the anti-ice power distribution function from PDUs/LRUs located in an unconditioned environment to LRUs located in a conditioned environment, by-product waste power is more efficiently dissipated than in prior art systems.

The ice protection system of the subject invention further includes a point of power regulation located within the vehicle, spaced from the power distribution units. From this point, power is fed to the power distribution units or LRUs through independent feeder wire bundles. By splitting the power feed wiring for the five LRUs into three separate feed wire bundles, line current is distributed across the system in a manner that optimizes wire weight.

In a preferred embodiment of the subject invention, the ice protection system is particularly well suited for use in an aircraft and it includes a plurality of de-ice power distribution units positioned within an engine nacelle of the aircraft. The system further includes at least two anti-ice power distribution units with integrated controllers spaced from the engine nacelle, and a point of power regulation (POR) located within the fuselage of the aircraft, spaced from the power distribution units, from which power is fed to the power distribution units.

The power distribution units are operatively connected to heaters associated with the engine nacelle. In particular, the de-ice power distribution units are associated with de-ice zones of the engine nacelle and the anti-ice power distribution units are associated with anti-ice zones of the engine nacelle.

Three-phase AC power is fed from the POR to the power distribution units or LRUs by way of three independent feeder wire bundles, so as to distribute line current across the system in a manner that optimizes wire weight. These include a first feeder wire bundle for one of the two anti-ice power distribution units, a second feeder wire bundle for the other of the two anti-ice power distribution units and a third feeder wire bundle for the plurality of de-ice power distribution units.

The subject invention is also directed to a new and useful method of distributing power to an ice protection system of an aircraft comprising the steps of accessing a point of power regulation in the fuselage of the aircraft, feeding power from the point of power regulation to a plurality of de-ice power distribution units located proximate to a leading edge surface of the aircraft that is susceptible to ice accretion, through an independent feeder wire bundle, and feeding power from the point of power regulation to at least two anti-ice power distribution units located within the fuselage of the aircraft, spaced from the de-ice power distribution units, through respective independent feeder wire bundles.

These and other features and benefits of the ice protection system of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the ice protection system of the subject invention without undue experimentation, preferred embodiments thereof will be described in detail hereinbelow with reference to certain figures, wherein:

FIG. 3 is a schematic representation of the power distribution architecture of an ice protection system constructed in accordance with a preferred embodiment of the subject invention for use in an engine nacelle de-icing system, which is designed to optimize system weight while efficiently distributing by-product waste power across the system electronics, where FIG. 3a is a localized view of a four-wire feeder bundle.

DETAILED DESCRIPTION OF PREFERRED EMBODIMENTS

Figure 1:
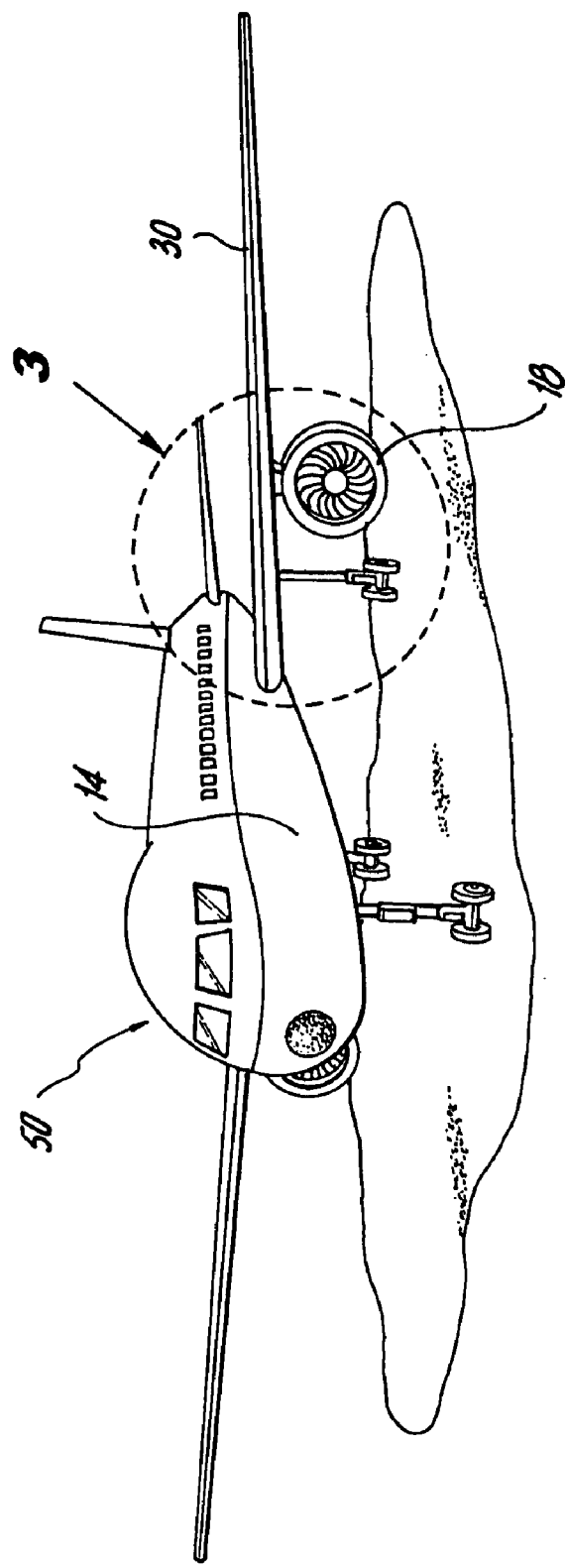
FIG. 1 is an illustration of an aircraft showing the components of the aircraft that are susceptible to ice accretion, with which the ice protection system of the subject invention is associated.

Referring now to the drawings, wherein like reference numerals identify similar structural features or aspects of the disclosed subject matter, there is illustrated in FIG. 3 a power distribution architecture for an ice protection system constructed in accordance with a preferred embodiment of the subject invention and designated generally by reference numeral 100. The power distribution architecture 100 of the subject invention is particularly suited for an ice protection system associated with the leading edge of an engine nacelle 18 of an aircraft 50, as shown in FIG. 1. However, the system architecture may be employed for ice protection of other aircraft component surfaces including, but not limited to, wings, struts, stabilizers, rotors and propellers. It is also envisioned that the system architecture could be employed in ice protection systems associated with marine vehicles having critical component surfaces that are susceptible to ice accretion under certain conditions.

Figure 2:
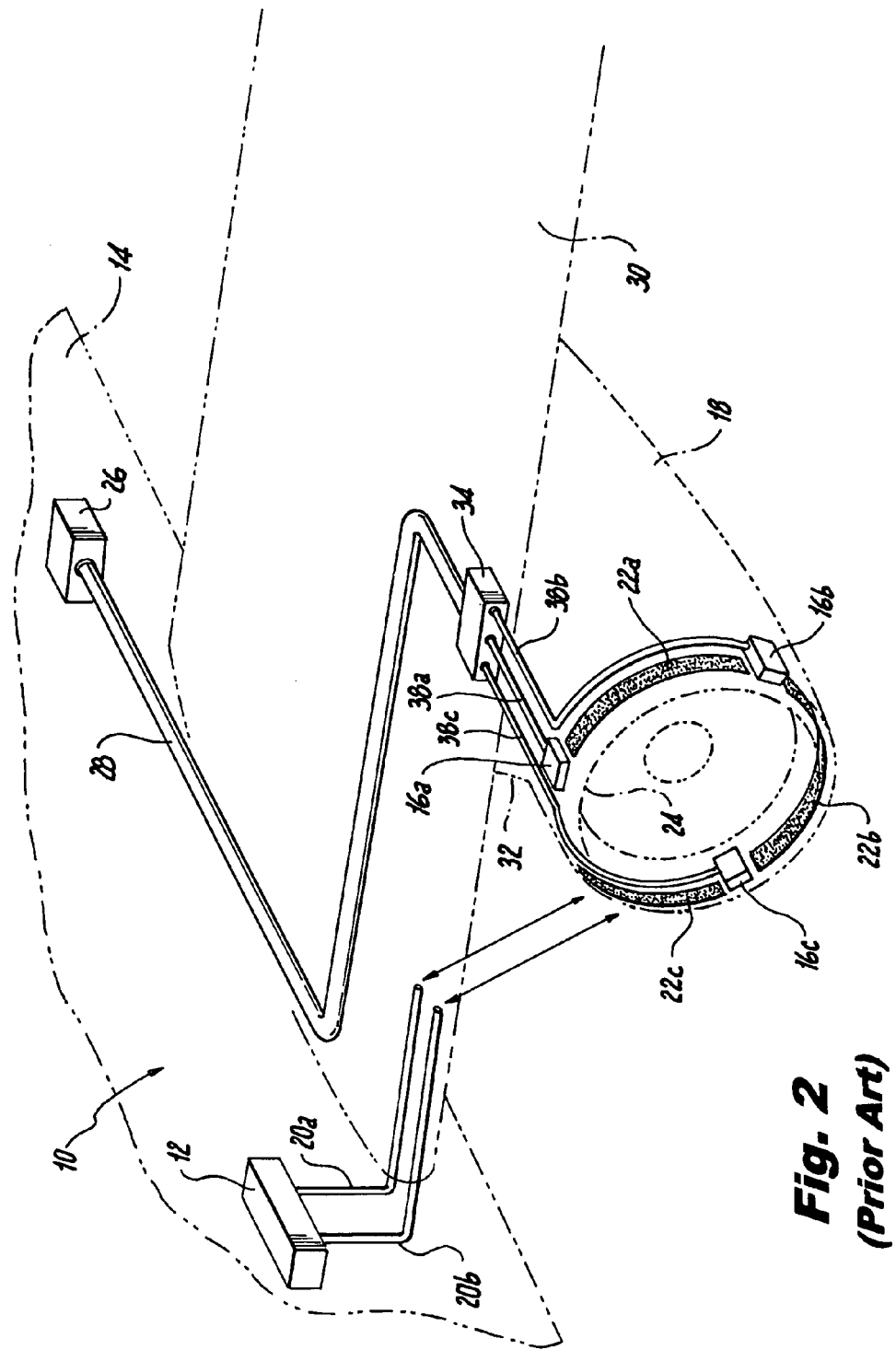
FIG. 2 is a schematic representation of the power distribution architecture of a prior art baseline ice protection system for an engine nacelle de-icing system in the aircraft of FIG. 1.

Referring to FIG. 3, the power distribution architecture of ice protection system 100 is substantially different from that of the baseline ice protection system shown in FIG. 2, in that it optimizes system weight (i.e., wire weight and LRU weight) while efficiently distributing by-product waste power amongst several LRUs by moving the anti-ice power distribution function from an unconditioned environment to a conditioned environment. More particularly, ice protection system 100 includes five LRUs, rather than four, including three de-ice power distribution units (DIPDUs) 116a-116c and two anti-icing power distribution units (AIPDUs) 112a, 112b.

The DIPDUs 116a-116c are associated with or otherwise disposed within the engine nacelle 18, proximate to the leading edge 24 thereof. The two AIPDUs 112a, 112b are spaced from the engine nacelle 18, and disposed within the fuselage 14 of aircraft 50. The DIPDUs 116a-116c and the AIPDUs 112a, 112b are operatively connected to a set of three heating element segments 122a-122c circumferentially arranged about the periphery of the engine nacelle.

Preferably, the heating element segments 122a-122c are in the form of heating pads or mats that are embedded in the lip of the engine nacelle 18. The three heating elements 122a-122c are preferably divided up into a plurality of zones. For example, each segment may include five heating zones, where the first two zones in each segment has a plurality of heaters for anti-icing and the remaining three zones each have a plurality of heaters for de-icing. Preferably, each zone has three heaters.

Those skilled in the art will readily appreciate that the number, shape, size and/or location of the heating elements can vary depending upon engine configuration. Exemplary de-icing heating elements are disclosed in U.S. Pat. No. 5,351,918, the disclosure of which is incorporated herein by reference.

The AIPDUs 112a, 112b of system 100 are associated with heating of anti-ice zones on the leading edge surface 24 of the of engine nacelle 18, while the DIPDUs 116a-116c are associated with heating of de-ice zones on the leading edge surface 24 of the engine nacelle 18, downstream from the anti-ice zones. Those skilled in the art will readily appreciate that the anti-ice zone is a region of higher power consumption than the de-ice zone. That is, in the anti-ice zone the heating elements serve to prevent ice accretion on the component surface in that zone. In the de-ice zone, the heating elements consume less power because ice that has accreted on the component surface in that zone will be sheared from the surface by the air flowing over the engine nacelle.

Preferably, in an effort to distribute power and by-product waste dissipation evenly across the system, only one zone in each segment is on at any given time. However, it is envisioned that the system can be configured to operate efficiently with more than one zone on in a segment, without undue experimentation. Furthermore, it is envisioned that the system can be configured to operate efficiently so that either one or two zones could be on in a segment, without undue experimentation Each of the AIPDUs 112a, 112b includes an integrated controller and a heat sink. The integrated controllers in the AIPDUs are adapted and configured to control the supply of energy from the five PDUs to the heating element segments 122a-122c embedded in the lip of the engine nacelle. Control of the DIPDUs is achieved by way of communication lines 120a, 120b. The heat sinks in the AIPDUs are adapted and configured for by-product power dissipation within the fuselage 14 of aircraft 50.

The power distribution architecture of ice protection system 100 further includes a point of regulation (POR) 126 located within the fuselage 14 of aircraft 50, from which power is fed to the five LRUs. In particular, three-phase AC power is fed from the point of power regulation 126 to the five LRUs by three independent four-wire feeder wire bundles 128a, 128b and 128c. Because feeder wire bundles 128a-128c carry three-phase power, each one is comprised of four wires. These include three power-carrying wires 130a-130c and one neutral wire 130d, as shown for example in FIG. 3a. It should be understood by those skilled in the art that in the segmented heater configuration described herein, wherein each zone includes three heaters, each heater in the zone will be driven by a different power phase.

Those skilled in the art will readily appreciate that the geometry of the four-wire feeder wire bundles (e.g., wye or delta) can vary depending upon system design requirements. However, a wye configuration is typically more preferable than a delta configuration in aircraft applications.

By splitting the power feed wiring for the five LRUs into three separate four-wire wire bundles (128a-128c), as compared to the single four-wire power cable 28 utilized in the prior art system 10 shown in FIG. 2, wire derating values (MIL-W-5088L) are markedly less, resulting in a wire weight reduction for the ice protection system of FIG. 3. This advantage over the prior art system will be explained in further detail below by way of a non-limiting example. Moreover, the dimensions stated in the following example, should not be taken to limit the scope of the subject disclosure in any way.

Referring to FIG. 3, four-wire feeder wire bundle 128a (which is about 70 feet in length) delivers three-phase AC power from the POR 126 to AIPDU 112a, four-wire feeder wire bundle 128b (which is about 70 feet in length) delivers three-phase AC power from the POR 126 to the second AIPDU 112b, and four-wire feeder wire bundle 128c (which is about 80 feet in length) delivers three-phase AC power to the plurality of de-ice power distribution units 116a-116c.

More particularly, feeder wire 128c is routed into a junction box 134 associated with the engine nacelle 18. Individual secondary feeder wire bundles 138a-138c (each averaging about 7.67 feet in length) extend from junction box 134 to the three DIPDUs 116a-116c. In a similar manner, conduit 148 carrying three individual four-wire bundles (each about 10 feet in length) extend from AIPDU 112a to the heating elements 122a-122c in engine nacelle 18, while conduit 158 carrying three individual four-wire bundles (each about 10 feet in length) extend from AIPDU 112b to the heating elements 122a-122c in engine nacelle 18.

As mentioned above, there is a weight savings associated with splitting the power feed wiring into three separate four-wire bundles 128a-128c as compared to the single power cable 28 of system 10. This weight savings results from a change in the wire gauge of the feed wires (i.e., moving from larger diameter wires to smaller diameter wires), as explained further below. Moreover, since the overall number of conductors in any particular three-phase power feed wire bundle 128a-128c is still four (three current carrying wires and one neutral wire), the current capacity of each feed wire bundle in system 100 is approximately ⅓ of the current capacity of the single power feed cable 28 used in the prior art system 10.

Because the two AIPDUs in system 100 each deliver approximately ⅓ of the total system power and all of the DIPDUs in system 100 collectively deliver approximately ⅓ of the total system power, the system line current of 67 A can be apportioned over the three primary four-wire feed wire bundles 128a-128c. This change in current capacity affords the system designer with an opportunity to decrease the overall wire weight of the system by changing wire gauges. Furthermore, it has been recognized by the inventors of the subject application that a change of AWG wire gauge of +6 or more in any one of the feed wire bundles 128a-128c will result in a lighter system in terms of wire weight.

In particular, if the phase currents in the three primary feed wire bundles are 20 A, 22 A and 25 A, a change of AWG+6 can be obtained for the power feed wires associated with at least one of the AIPDUs or the DIPDUs. Moreover, derating the power feed wires in accordance with MIL-W-5088L for 25,000 ft. altitude operation at 25° C. in a four-conductor power feed system with 75% utilization yields the following exemplary feed wire requirements: AWG 12 wires for feeder wire bundle 128a running from the POR 126 to AIPDU 112a; AWG 14 wires for feeder wire bundle 128b running from the POR 126 to AIPDU 112b; and AWG 12 wires for feeder wire bundle 128c running from POR 126 to the junction box 134 for DIPDUs 116a-116c.

Thus, in this example, as a result of splitting the power feed wiring into three separate feed wire bundles, feed wire bundle 128b associated with AIPDU 112b saves system weight by going from AWG 8 to AWG 14 (a change in wire gauge of AWG+6). As a result, the wire weight of ice protection system 100 is 17 lbs, as compared to the wire weight of 18.4 lbs for the prior art system 10 shown in FIG. 2. Those skilled in the art will readily appreciate that feed wire lengths exceeding 80 feet would generate even greater weight savings relative to the prior art system architecture.

The two AIPDUs (112a, 112b) and the three DIPDUs (116a-116c) weigh 66 lbs collectively. Thus, the total weight of system 100 (wire and electronics) is approximately 83 lbs, as compared to the collective weight of 97 lbs for the baseline system architecture illustrated in FIG. 2. This constitutes a 14% decrease in weight over the prior art system.

Also, the addition of the two LRUs (i.e., AIPDUs 112a, 112b) allows for power dissipation to be spread out amongst five LRUs as opposed to the four LRUs of the prior art system shown in FIG. 1. In addition, much of the heat generating circuitry (e.g., the circuitry associated with the anti-ice power distribution function) is moved from the unconditioned environment of the engine nacelle into the conditioned environment of the fuselage, affording more room and a more conducive environment for heat sinking. In the ice protection system 100 of the subject invention, the two AIPDUs and the DIPDUs must dissipate 62W and 15W of by-product waste power, respectively. This is compared to the 56W per PDU that must be dissipated by the distributed architecture of FIG. 2. Thus, by employing the power distribution architecture of the subject invention, the power dissipation per nacelle-based PDU is decreased by 76% and the bulk of the waste power dissipation is moved from the nacelle, where space is limited and air may be thinner, to the fuselage where the environment is more conducive to by-product power dissipation.

While the subject invention has been described with reference to a particular wiring arrangement in which feed wires and wire bundles have particular lengths, those skilled in the art should readily appreciate and understand that the arrangement is merely an exemplary embodiment of the invention and in no way should it be construed to limit the scope of the subject disclosure in any way.

Moreover, while the apparatus of the subject invention has been shown and described with reference to preferred embodiments, those skilled in the art will readily appreciate that various changes and/or modifications may be made thereto without departing from the spirit and scope of the subject invention as defined by the appended claims. For example, while the power distribution architecture of the subject invention has been described with respect to an ice protection system for an engine nacelle, those skilled in the art should readily appreciate that the same architecture could be employed to optimize wire weight and heat by-product heat dissipation in ice protection systems utilized in conjunction with various aircraft component surfaces including, but not limited to wings, struts, stabilizers, rotors and propellers.

What is claimed is:

1. An ice protection system for a vehicle comprising:
   a) a plurality of de-ice power distribution units positioned proximate to a leading edge surface of the vehicle that is susceptible to ice accretion;
   b) at least two anti-ice power distribution units located in a conditioned environment within the vehicle, spaced from the de-ice power distribution units; and
   c) a point of power regulation located within the vehicle, spaced from each of the power distribution units, from which three-phase AC power is fed to each of the anti-ice power distribution units through independent feeder wire bundles, and from which three-phase AC power is fed to the plurality of de-ice power distribution units through another independent feeder wire bundle, so as to distribute line current across the system in a manner that optimizes wire weight.

2. An ice protection system as recited in claim 1, wherein the power distribution units are operatively connected to heaters associated with the leading edge surface of the vehicle that is susceptible to ice accretion.

3. An ice protection system as recited in claim 1, wherein each anti-ice power distribution unit includes an integrated controller.

4. An ice protection system as recited in claim 1, wherein each anti-ice power distribution unit is adapted for by-product power dissipation within the vehicle.

5. An ice protection system for an aircraft comprising:
   a) a plurality of de-ice power distribution units positioned within an engine nacelle of the aircraft;
   b) at least two anti-ice power distribution units located within the fuselage of the aircraft, spaced from the engine nacelle; and
   c) a point of power regulation located within the fuselage of the aircraft, spaced from the at least two anti-ice power distribution units, from which three-phase AC power is fed to the de-ice power distribution units within the engine nacelle and to the anti-ice power distribution units within the fuselage.

6. An ice protection system as recited in claim 5, wherein the power distribution units are operatively connected to heaters associated with the engine nacelle.

7. An ice protection system as recited in claim 6, wherein the de-ice power distribution units are associated with de-ice zones of the engine nacelle.

8. An ice protection system as recited in claim 6, wherein the anti-ice power distribution units are associated with anti-ice zones of the engine nacelle.

9. An ice protection system as recited in claim 5, wherein each anti-ice power distribution unit includes an integrated controller.

10. An ice protection system as recited in claim 5, wherein each anti-ice power distribution unit is adapted for by-product power dissipation within the fuselage of the aircraft.

11. An ice protection system as recited in claim 5, wherein three-phase AC power is fed from the point of power regulation to each of the anti-ice power distribution units through independent feeder wire bundles, and wherein three phase AC power is fed from the point of power regulation to the plurality of de-ice power distribution units through another independent feeder wire bundle, so as to distribute line current across the system in a manner that optimizes wire weight.

12. An ice protection system as recited in claim 11, wherein the feeder wire bundle for the plurality of de-ice power distribution units is fed from the point of regulation into a junction box, which distributes power to the plurality of de-ice power distribution units.

13. A method of distributing power to an ice protection system of an aircraft in a manner that optimizes wire weight comprising the steps of:
   a) accessing a point of power regulation in the fuselage of the aircraft;
   b) feeding three-phase AC power from the point of power regulation to a plurality of de-ice power distribution units located proximate to a leading edge surface of the aircraft that is susceptible to ice accretion, though a first feeder wire bundle; and
   c) feeding three-phase AC power from the point of power regulation to at least two anti-ice power distribution units located within the fuselage of the aircraft, spaced from the de-ice power distribution units, through respective independent feeder wire bundles.

14. A method according to claim 13, further comprising the step of dissipating by-product power from the anti-ice power distribution units within the fuselage of the aircraft.

15. A method according to claim 13, further comprising the step of directing the first feeder wire bundle into a junction box, which distributes power to the plurality of de-ice power distribution units.

* * * * *